United States Patent [19]
Kyber et al.

[11] Patent Number: 5,266,601
[45] Date of Patent: Nov. 30, 1993

[54] PROCESS FOR PREPARING POLYBUTYLENE TEREPHTHALATE FROM PET SCRAP

[75] Inventors: Manfred Kyber, Maintal; Wolfgang Schmidt, Rodenbach; Uwe Schollar, Offenbach, all of Fed. Rep. of Germany

[73] Assignee: Zimmer Aktiengesellschaft, Frankfurt, Fed. Rep. of Germany

[21] Appl. No.: 930,200

[22] Filed: Aug. 17, 1992

[30] Foreign Application Priority Data

Jun. 23, 1992 [DE] Fed. Rep. of Germany ....... 4220473

[51] Int. Cl.$^5$ .............................................. C08J 11/24
[52] U.S. Cl. .................................... 521/48.5; 521/48; 525/437
[58] Field of Search ................. 521/48.5, 48; 525/437

[56] References Cited

U.S. PATENT DOCUMENTS 3,951,886  4/1976  Miyake et al. ..................... 521/48.5

FOREIGN PATENT DOCUMENTS 0273446  11/1989  Fed. Rep. of Germany ..... 521/48.5

*Primary Examiner*—Harold D. Anderson
*Attorney, Agent, or Firm*—Allegretti & Witcoff, Ltd.

[57] ABSTRACT

Process for producing polybutylene terephthalate with less than 1.0 wt % units derived from ethylene glycol from polyethylene terephthalate scrap by diolysis and ester exchange with 1,4-butanediol and subsequent polycondensation.

6 Claims, No Drawings

PROCESS FOR PREPARING POLYBUTYLENE TEREPHTHALATE FROM PET SCRAP

BACKGROUND OF THE INVENTION

This invention concerns a process for preparing polybutylene terephthalate (PBT) by butanediolysis of polyethylene terephthalate scrap (PET scrap), ester exchange of the diolyzate and polycondensation.

Due to the increasing use of PET containers, especially PET beverage bottles, there is an increasing demand for methods for recycling PET scrap.

PRIOR ART

It has long been known that glycolysis of PET scrap to oligomers (British Patent 610,136) and polycondensation of the resulting glycolyzates to PET (German Patent (ALS) 1,151,939, European Patent (OLS) 174,062) are possible. However, the market for such recycled PET is limited because it has not been approved for food packaging and it is not suitable for high quality fibers. There is no additional demand for fibers of a mediocre grade.

Continued degradation of PET to the monomers (U.S. Pat. Nos. 3,544,622 and 5,051,528), their purification and renewed polycondensation lead to recycled PET of an improved quality but they are not economically feasible.

Depolymerization of PET scrap with a diol other than ethylene glycol such as propanediol, neopentyl glycol (British Patent 1,158,561 and German Patent (ALS) 2,413,717) or 1,4-cyclohexanedimethanol (U.S. Pat. No. 4,259,478) and polycondensation of the diolyzate, usually with the addition of aliphatic or unsaturated polycarboxylic acids, lead to copolyesters with very limited chances on the market.

However, there is a great demand for PBT for molded articles and for carpet fibers. Therefore there has been a great deal of interest in the production of butylene terephthalate homopolymers from PET scrap. However, no practical examples of diolysis with 1,4-butanediol (1,4-BD) or of the subsequent production of homopolymers that differ from PET can be obtained from the literature.

A direct transfer of the parameters used for other diols to diolysis with 1,4-BD fails due to the great production of tetrahydrofuran (more than 0.5 mol THF per mol PET). Dehydration of 1,4-BD to THF takes place more easily than diolytic degradation of PET. Quantitative cleavage and removal of ethylene glycol (EG) is also difficult.

SUMMARY OF THE INVENTION

The object of the present invention is to produce PBT containing less than 1.0 wt % units of ethylene glycol from PET scrap. Furthermore, the amount of THF generated in the process should be reduced as much as possible to the extent that this PBT is economically competitive with PBT obtained from monomers.

This problem is solved according to this invention in accordance with the process set forth in the following specification.

The starting material is PET scrap or waste of any origin, especially used PET beverage bottles, in the form of ground material. Essentially both colorless and pigmented PET waste can be used. However, colored starting materials are suitable only for producing PBT that is itself to be pigmented in a dark color. Depending on the pigment, there may be negative effects on the reaction process in some cases but these effects can be compensated by varying the amount of catalyst and/or the residence time.

In addition to the quality of the PBT product, minimizing the production of tetrahydrofuran is a crucial factor in making the process according to this invention economically competitive. Formation of tetrahydrofuran occurs to a great extent when free 1,4-butanediol is exposed to high temperatures. Reaction conditions that promote diolysis increase the formation of THF. Therefore, reaction parameters that permit diolysis without accelerating the formation of THF had to be discovered.

According to this invention, this is accomplished by first adding only enough 1,4-BD to the PET as is necessary to yield a mixture that can be processed well at the reaction temperature. For scrap PET with an intrinsic viscosity in the range of 0.65 to 0.85 dl/g, 0.2 to 0.5 mol 1,4-BD per mol PET is sufficient. For higher viscosity PET, larger amounts of 1,4-BD may be necessary, namely up to 1.0 mol 1,4-BD per mol PET.

In addition, the diolysis temperature should not exceed 250° C., preferably 230° C., especially 225° C. The lower limit is 200° C. If the temperature goes below this limit, the rate of diolysis will not be adequate or if the temperature exceeds this limit, there will be a great increase in the production of THF.

Preferably only enough catalyst as is necessary for diolysis is used in the diolysis step, and the catalyst needed for the ester exchange and polycondensation reactions is not added until later. Titanium compounds that are soluble in 1,4-BD such as tetraisopropyl titanate or tetrabutyl titanate are the preferred catalysts. Tin compounds such as n-butyltin hydroxide oxide or monobutyltin tris(2-ethylhexanoate) can also be used but they have a lower activity. The amount of catalyst needed for diolysis should correspond to 10 to 300 ppm titanium or tin, preferably 10 to 30 ppm titanium.

The other diolysis parameters, i.e., pressure, mechanical energy applied and residence time, depend on the apparatus used, and a distinction should be made between a stirred autoclave and an extruder. A stirred autoclave is especially suitable for discontinuous operation and for smaller installations. The single screw extruders which are expensive in terms of investments are preferred for continuous operation.

In a stirred autoclave, diolysis takes place at a pressure of at least 1 bar, preferably under autogenous pressure which is a maximum of about 2.5 bar with the stated amount of 1,4-BD and at the given temperature. The PET-butanediol mixture is very viscous because of the limit on the amount of 1,4-BD and therefore permits only a low stirring speed of, for example, 10 rpm at the start of diolysis and 80 rpm at the end of diolysis. The amount of energy input into the system is low. Residence times in the range of 30 to 60 minutes, preferably 40 to 50 minutes, are therefore necessary for an adequate degree of diolysis.

With single screw extruders, the pressure and energy input are determined by the screw geometry. With the common extruders available on the market such as those also used for incorporating liquid additives into polymers, the pressures are in the range of 3.0 to 25 bar, preferably 10 to 20 bar. The mechanical energy input is high so residence times of 1 to 20 minutes, preferably 1 to 5 minutes, are sufficient.

If the parameters according to this invention are maintained, the formation of THF in the diolysis stage will amount to a maximum of about 14 mol %, preferably a maximum of about 11 mol %, based on PET.

The diolysis mixture which contains mostly ethylene terephthalate oligomer is then subjected to ester exchange with 1,4-butanediol at a temperature in the range of 190° to 250° C., preferably 190° to 230° C., and a pressure in the range of 0.1 to 1.0 bar, preferably 150 to 300 mbar. The temperature should be as low as possible, i.e., equal to or preferably lower than the temperature in the diolysis stage, because otherwise more THF is formed.

During the ester exchange reaction, the amount of 1,4-BD present in the reaction mixture should always be only slightly more than would correspond to the ester exchange rate (free 1,4-BD). The required extra amount of 1,4-BD of 1.0 to 3.0 mol 1,4-BD, preferably 2.3 to 2.7 mol 1,4-BD per mol PET is therefore added continuously throughout the entire reaction period while at the same time the ethylene glycol (EG) that has split off and the resulting tetrahydrofuran are distilled off. Preferably the rate of feed of 1,4-BD is reduced in proportion to the rate at which EG is distilled off with a longer residence time.

Additional catalyst corresponding to 50 to 250 ppm titanium or tin, preferably corresponding to 80 to 120 ppm titanium is fed continuously into the ester exchange stage, preferably together with 1,4-BD.

The residence time must assure almost complete ester exchange of the ethylene terephthalate oligomer to butylene terephthalate oligomer. With a residence time in the range of 90 to 180 minutes, preferably 130 to 170 minutes, the amount of units derived from ethylene glycol in the final polymer is less than 1.0 wt %, preferably less than 0.5 wt %.

Any diethylene glycol units present in the starting PET are also eliminated as completely as possible. Ethylene isophthalate units, present in the PET scrap in amounts of up to about 5% in some cases, are converted to butylene isophthalate units.

The subsequent precondensation and polycondensation take place in a known way. Precondensation takes place with a continuous reduction in pressure to a value in the range of 100 to 10 mbar, preferably 50 to 10 mbar, and with a simultaneous increase in temperature up to a value in the range of 230° to 260° C., preferably 245° to 255° C., while distilling off the excess 1,4-BD and the reaction water. The 1,4-butanediol distilled off can be used again in the ester exchange state, preferably after distillative purification. The residence time is 45 to 90 minutes.

After adding more catalyst corresponding to 10 to 100 ppm titanium or tin, preferably 20 to 50 ppm titanium, the pressure is lowered to a maximum of 1.5 mbar while maintaining the same temperature and polycondensation is continued until achieving the desired intrinsic viscosity of at least 0.90 dl/g. The required residence time is in the range of 60 to 180 minutes. Subsequent polycondensation in the solid phase is possible.

Starting with colorless PET scrap, PBT having the same properties as PBT produced from monomers is obtained. The total amount of THF formed is a maximum of about 22 mol %, preferably a maximum of about 18 mol %, based on PEt, which is thus higher than in the production of PBT based on the monomer but is compensated by the use of the less expensive PET scrap as a raw material.

SPECIFIC EXAMPLES

PET bottle scrap with the following characteristics was used for the following examples:

|  |  | For Examples Nos. 1–5 | For Examples Nos. 6–10 |
| --- | --- | --- | --- |
| Intrinsic viscosity | dl/g | 0.840 | 0.756 |
| Ash content | ppm | 460 | 413 |
| Diethylene glycol | wt % | 1.96 | 1.27 |
| Color |  | colorless | colorless |
| Isophthalic acid | wt % | 2.8 | 0.93 |
| Antimony | ppm | 125 | 169 |
| Phosphorus | ppm | 45 | 45 |
| Melting point DSC | °C. | 242.3 | 250.3 |
| Bulk density | kg/l | 0.47 | 0.45 |

The intrinsic viscosity was determined on a solution of 0.5 g polymer in 100 ml of a mixture of phenol and 1,2-dichlorobenzene (3:2 parts by weight) at 25° C.

The inorganic components were determined by mass spectrometry and the organic components were determined by gas chromatography, optionally after pressure methanolysis of the polyester.

PROCEDURE

Shredded PET bottle waste, 1,4-butanediol and tetra-n-butyl titanate or monobutyltin tris(2-ethylhexanoate) as the catalyst were placed in a high grade steel stirred autoclave and then after sealing the autoclave the mixture was heated to the diolysis temperature while stirring.

After diolysis was concluded, the pressure was reduced and 1,4-butanediol-catalyst solution was added continuously. At the same time the ethylene glycol that was split off was distilled off together with the THF thus formed and traces of 1,4-BD and water. The 1,4-butanediol-catalyst solution was added at a constant feed rate except in Example No. 7, where the feed rate was proportional to the rate at which ethylene glycol was distilled off in Example 6 but was otherwise the same.

After the release of ethylene glycol was practically concluded, the addition of 1,4-BD catalyst was interrupted, the pressure was lowered continuously and the temperature was increased gradually. At the same time, the excess 1,4-BD and the reaction water and remaining THF were distilled off.

After conclusion of the precondensation step, additional catalyst dissolved in a very small amount of 1,4-BD was added and the pressure was set at less than 1.5 mbar. Polycondensation was continued until achieving the desired intrinsic viscosity. Next the melt was discharged from the reactor and granulated.

In Example No. 10, diolysis was performed continuously in a single-screw extruder (maximum throughput 5 kg/hr) with two temperature zones and a liquid feed after the first temperature zone. In the first temperature zone, the ground PET bottle scrap was melted at 280° C. without the addition of 1,4-butanediol. Immediately thereafter, the 1,4-butanediol-catalyst solution was added. The temperature and residence time listed in the table are based on the second temperature zone after the 1,4-butanediol feed.

The following ester exchange, precondensation and polycondensation were also performed continuously in three successive reactors. The residence times given in the table are averages.

Examples Nos. 1 to 3 are comparative examples.

|  | Diolysis | | | | | Ester Exchange | | | | |
| --- | --- | --- | --- | --- | --- | --- | --- | --- | --- | --- |
| Example Number | 1,4-BD mol/mol PET | Catalyst ppm | Temperature °C. | Pressure mbar | Duration min. | 1,4-BD mol/mol PET | Catalyst ppm | Temperature °C. | Pressure mbar | Duration min. |
| Comparison: | | | | | | | | | | |
| 1 | 1.4 | — | 225 | 2300 | 45 | 1.0 | — | 225 | 250 | 150 |
| 2 | 1.4 | 60 Ti | 225 | 2300 | 45 | 1.0 | 55 Ti | 225 | 250 | 150 |
| 3 | 1.0 | 60 TI | 260 | 2250 | 25 | 1.5 | 80 Ti | 225 | 250 | 150 |
| Invention: | | | | | | | | | | |
| 4 | 1.0 | 60 Ti | 225 | 2250 | 45 | 1.5 | 80 Ti | 225 | 250 | 150 |
| 5 | 0.64 | 40 Ti | 225 | 2250 | 45 | 1.5 | 100 Ti | 195 | 250 | 150 |
| 6 | 0.21 | 20 Ti | 220 | 2250 | 40 | 2.4 | 100 Ti | 190 | 200 | 150 |
| 7 | 0.21 | 20 Ti | 220 | 2250 | 40 | 2.4 | 100 Ti | 190 | 200 | 150 |
| 8 | 0.21 | 30 Sn | 230 | 2250 | 30 | 2.35 | 165 Sn | 210 | 250 | 180 |
| 9 | 0.43 | 60 Ti | 230 | 1000 | 60 | 2.15 | 100 Ti | 220 | 150 | 120 |
| 10 | 0.21 | 30 Ti | 250 | 10000 | 4 | 2.35 | 100 Ti | 200 | 200 | 140 |

|  | Precondensation | | | Polycondensation | | | | Total THF mol-% | PBT | | |
| --- | --- | --- | --- | --- | --- | --- | --- | --- | --- | --- | --- |
| Example Number | Temperature °C. | Pressure mbar | Duration min. | Catalyst ppm | Temperature °C. | Pressure mbar | Duration min. | | Intrinsic Viscocity dL/g | EG wt % | Color |
| 1 | 245 | 50 | 90 | 240 Ti | 255 | <1.5 | 150 | 56 | 0.71 | 17.2 | Yellowish |
| 2 | 245 | 50 | 90 | 100 Ti | 255 | <1.5 | 100 | 28 | 1.10 | 1.4 | Slightly Yellowish |
| 3 | 245 | 50 | 90 | 100 Ti | 255 | <1.5 | 100 | 41 | 1.09 | 0.85 | Slightly Yellowish |
| 4 | 245 | 50 | 90 | 100 Ti | 255 | <1.5 | 100 | 21.6 | 1.11 | 0.80 | Colorless |
| 5 | 245 | 50 | 90 | 80 Ti | 255 | <1.5 | 100 | 20.2 | 1.04 | 0.55 | Colorless |
| 6 | 245 | 20 | 70 | 30 Ti | 255 | <1.0 | 120 | 17.9 | 1.08 | 0.21 | Colorless |
| 7 | 245 | 20 | 70 | 30 Ti | 255 | <1.0 | 120 | 17.6 | 1.10 | 0.16 | Colorless |
| 8 | 245 | 20 | 70 | 100 Sn | 255 | <1.5 | 110 | 18.3 | 1.06 | 0.28 | Colorless |
| 9 | 245 | 50 | 80 | 50 Ti | 255 | <1.0 | 130 | 20.8 | 1.14 | 0.24 | Colorless |
| 10 | 245 | 20 | 60 | 40 Ti | 255 | <1.0 | 140 | 18.0 | 1.12 | 0.25 | Colorless |

Note:
The quantities indicated for the catalyst and THF are based on PET.

We claim:

1. Process for producing polybutylene terephthalate from polyethylene terephthalate scrap, said polybutylene terephthalate having less than 1.0 wt % units of ethylene glycol and an intrinsic viscosity of at least 0.90 dl/g, determined on a solution 0.5 g polymer in 100 ml of a mixture of phenol and 1,2-dichlorobenzene (3:2 parts by weight) at 25° C. characterized in that
   a) shredded polyethylene terephthalate scrap (PET) is subjected to depolymerization with 1,4-butanediol (1,4-BD) in a ratio of 0.2 to 1.0 mol 1,4-BD per mol PET in the presence of a catalyst corresponding to 10 to 100 ppm titanium or tin, based on PET, at a temperature in the range of 200° to 250° C. at a pressure of at least 1.0 bar,
   b) the resulting mixture from step a) is subjected to ester exchange with a continuous feed of additional 1,4-butanediol in a ratio of 1.0 to 3.0 mol 1,4-BD per mol PET and additional catalyst corresponding to 50 to 250 ppm titanium or tin, based on PET, at a temperature in the range of 190° to 250° C., a pressure in the range of 0.1 to 1.0 bar and a residence time in the range of 90 to 180 minutes while at the same time distilling off ethylene glycol and tetrahydrofuran as formed,
   c) the resulting ester exchange mixture from step b) is precondensed with a continuous reduction in pressure to a value in the range of 100 to 10 mbar while at the same time raising the temperature to the range of 230° to 260° C. with a residence time in the range of 45 to 90 minutes while at the same time distilling off excess 1,4-butanediol and reaction water,
   d) the precondensation mixture from step c) is polycondensed after adding additional catalysts corresponding to 10 to 100 ppm titanium or tin, based on PET, at a temperature in the range of 230° to 260° C. and a maximum pressure of 1.5 mbar.

2. Process according to claim 1, characterized in that shredded polyethylene terephthalate scrap (PET) is subjected to depolymerization in a stirred reactor under autogenous pressure at a residence time in the range of 30 to 60 minutes.

3. Process according to claim 1, characterized in that shredded polyethylene terephthalate scrap (PET) is subjected to depolymerization in a single screw extruder at a pressure in the range of 3.0 to 25 bar and a residence time in the range of 1 to 20 minutes.

4. Process according to claim 3, characterized in that the residence time is 1 to 5 minutes.

5. Process according to claim 1 in step a) said ratio is 0.2 to 0.5 mol 1,4-butanediol per mol PET and the catalyst is present in an amount corresponding to 10 to 30 ppm titanium and the temperature is in the range of 220° to 230° C., in step b) said ratio is 2.3 to 2.7 mol 1,4-butanediol per mol PET and the catalyst corresponds to 80 to 120 ppm titanium, the temperature is in the range of 190° to 230° C., the pressure is in the range of 150 to 300 mbar and the residence time is in the range of 130 to 170 min, in step c) the final temperature is in the range of 245° to 255° C. and the final pressure is in the range of 50 to 10 mbar, in step d) the catalyst is used in an amount corresponding to 20 to 50 ppm titanium and the temperature is in the range of 245° to 255° C.

6. Process according to claim 1, characterized in that in step b) the rate of feed of 1,4-butanediol is reduced in proportion to the rate of distillation of ethylene glycol as residence time becomes longer.

* * * * *